(12) United States Patent
Matschas et al.

(10) Patent No.: US 11,852,202 B2
(45) Date of Patent: Dec. 26, 2023

(54) COOLING OIL CONDUCTING ELEMENT AND DRIVETRAIN COMPRISING SAME

(71) Applicant: ZF FRIEDRICHSHAFEN AG, Friedrichshafen (DE)

(72) Inventors: Steffen Matschas, Bad Bocklet (DE); Axel Rohm, Schonungen (DE); Ingo Krafft, Werneck (DE); Monika Rößner, Donnersdorf (DE); Angelika Ebert, Schonungen (DE); Julian Larbig, Ringgau-Röhrda (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 8 days.

(21) Appl. No.: 17/604,097

(22) PCT Filed: Apr. 16, 2020

(86) PCT No.: PCT/EP2020/060738
§ 371 (c)(1),
(2) Date: Oct. 15, 2021

(87) PCT Pub. No.: WO2020/212511
PCT Pub. Date: Oct. 22, 2020

(65) Prior Publication Data
US 2022/0221010 A1    Jul. 14, 2022

(30) Foreign Application Priority Data

Apr. 17, 2019    (DE) .................... 10 2019 205 570.2

(51) Int. Cl.
*F16H 25/06*    (2006.01)
*F16D 25/12*    (2006.01)
(Continued)

(52) U.S. Cl.
CPC ....... *F16D 25/123* (2013.01); *F16D 25/0638* (2013.01); *F16D 25/10* (2013.01); *F16D 2300/0214* (2013.01); *F16D 2300/08* (2013.01)

(58) Field of Classification Search
CPC ..... F16D 25/123; F16D 25/0638; F16D 13/70
See application file for complete search history.

(56) References Cited

U.S. PATENT DOCUMENTS

| 4,913,267 A |   | 4/1990 | Campbell et al. |
|---|---|---|---|
| 5,101,953 A | * | 4/1992 | Payvar .................... F16D 13/64 188/218 XL |

(Continued)

FOREIGN PATENT DOCUMENTS

| DE | 102007035243 A1 | * | 1/2009 | ............. F16D 13/70 |
|---|---|---|---|---|
| DE | 102011005504 |   | 9/2012 | |

(Continued)

OTHER PUBLICATIONS

Office Action of the corresponding German Patent Application No. 10 2019 205 570.2.

*Primary Examiner* — Stacey A Fluhart
(74) *Attorney, Agent, or Firm* — Cozen O'Connor (57) ABSTRACT

A cooling oil guiding device for rotating component parts. An annular oil channel extends in radial direction and cooling oil can be supplied from radially inward. The oil channel is partially open radially outwardly. A sealing area is provided in a radially outer area of the oil channel having blocking elements and outlet elements. The blocking elements are arranged radially inwardly of the outlet elements and have at least two passages in radial direction which are distributed along the circumference. Outlet channels aligned with the passages and inlets which are disposed between the outlet channels in circumferential direction are formed by the outlet elements. An annular channel is provided between (Continued)

the blocking elements and the outlet elements to connect the inlets with the outlet channels and passages, respectively.

10 Claims, 3 Drawing Sheets

(51) Int. Cl.
 *F16D 25/0638* (2006.01)
 *F16D 25/10* (2006.01)

(56) References Cited

U.S. PATENT DOCUMENTS

| | | | | |
|---|---|---|---|---|
| 5,163,526 | A | * | 11/1992 | Morgun ................ F16D 65/127 188/218 XL |
| 5,176,236 | A | * | 1/1993 | Ghidorzi ................ F16D 13/72 188/218 XL |
| 5,901,826 | A | * | 5/1999 | Datta .................... F16D 13/648 192/70.14 |
| 6,978,874 | B2 | * | 12/2005 | Miyoshi ................ F16D 25/123 192/113.36 |
| 8,727,092 | B2 | * | 5/2014 | Asai ...................... F16D 13/648 192/70.14 |
| 9,109,640 | B2 | * | 8/2015 | Reiners ................ F16D 25/123 |
| 10,731,712 | B2 | * | 8/2020 | Ohashi .................. F16D 25/123 |
| 2007/0039796 | A1 | * | 2/2007 | Schroder ............... F16D 25/123 192/85.61 |
| 2011/0132710 | A1 | * | 6/2011 | Schenck ............. F16D 25/0638 192/3.33 |
| 2018/0216674 | A1 | * | 8/2018 | Takakura ................ F16D 13/74 |
| 2022/0205493 | A1 | * | 6/2022 | Sugiura .................. F16D 13/68 |

FOREIGN PATENT DOCUMENTS

| | | |
|---|---|---|
| DE | 102011006027 | 9/2012 |
| DE | 102016223019 | 5/2018 |
| DE | 102018130331 A1 * | 3/2020 |

* cited by examiner

COOLING OIL CONDUCTING ELEMENT AND DRIVETRAIN COMPRISING SAME

CROSS REFERENCE TO RELATED APPLICATIONS

This is a U.S. national stage of Application No. PCT/EP2020/060738 filed Apr. 16, 2020. Priority is claimed on German Application No. DE 10 2019 205 570.2 filed Apr. 17, 2019 the content of which is incorporated herein by reference.

BACKGROUND OF THE INVENTION

1. Field of the Invention

The present disclosure is directed to a guiding element for cooling oil at a rotating component part.

2. Description of Related Art

Various possibilities for distributing cooling oil are known in the art, for example, by selective guiding via closed channels arranged in the housing or component parts, or distributing by rotating component parts, where the component parts run through an oil sump and/or distribute cooling oil which is supplied centrally by centrifugal force. Problems with the prior art consist in the uncontrolled swirling and uncontrolled distribution of the cooling oil.

SUMMARY OF THE INVENTION

It is the object of one aspect of the present invention to provide a cooling oil guiding element that can selectively distribute the cooling oil.

One aspect of the invention is a cooling oil guiding device and a powertrain.

According to one aspect of the invention, a cooling oil guiding device for rotating parts in which an annular oil channel extends in radial direction and in which cooling oil can be supplied from radially inward and the oil channel is partially open radially outwardly is characterized in that a sealing area is provided in a radially outer area of the oil channel, in that the sealing area has blocking elements and outlet elements, the blocking elements are arranged radially inwardly of the outlet elements and have at least two passages in radial direction which are distributed along the circumference, outlet channels that are aligned with the passages and inlets that are disposed between the outlet channels in circumferential direction are formed by the outlet elements, and an annular channel is provided between the blocking elements and the outlet elements in order to connect the inlets with the outlet channels and passages, respectively.

Oil is often guided via a shaft or hub at rotating component parts, particularly in the area of a powertrain of a vehicle. An oil channel is needed, for example, to route oil to surrounding component parts for cooling. In many cases, however, a selective routing of the cooling oil is advantageous because otherwise oil possibly reaches component parts that are not to be supplied with oil or should only be supplied with small amounts of oil. The outlet of cooling oil can be shifted farther radially outward by an oil channel arranged annularly around the rotating component part.

For the cooling oil to exit in a defined manner, a sealing area is provided in the radially outer area of the oil channel. The sealing area comprises a plurality of blocking elements that are provided circumferentially, preferably on a diameter, and passages having a defined cross section are formed between the blocking elements. The amount of cooling oil can be defined through the passages, in particular through the quantity and cross section thereof.

The blocking elements are radially outwardly surrounded by outlet elements. The outlet elements define outlet channels in radial direction that are aligned with the passages. The cooling oil can be selectively delivered radially outward to surrounding component parts via the outlet channels. In addition, inlets, which are arranged in circumferential direction between the outlet channels, are defined by the outlet elements. There are at least half as many inlets as outlet channels, and up to a multiple of inlets, particularly twice as many, can also be provided. Preferably, an equal amount of outlet channels and inlets can be provided.

An annular channel that connects the inlets with the outlet channels and, therefore, also the passages is provided between the blocking elements and the outlet elements. At least one inlet is connected with at least one outlet channel by the annular channel in each instance. This also means that an inlet is connected to a plurality of outlet channels and/or an outlet channel is connected to a plurality of inlets. An advantageous example provides an annular channel surrounding the entire circumference.

Because of the cooling oil exiting from the outlet channels, a negative pressure is formed radially inwardly. To prevent a swirling of the cooling oil due to the negative pressure, inlets are provided via which an atmosphere such as air surrounding the rotating component part can flow in so as to equalize the negative pressure. The in-flowing air exits from the outlet channel together with the cooling oil. Accordingly, a kind of centrifugal pump effect takes place.

Embodiment forms of a cooling oil guiding device are characterized in that the cross section of the passages decreases radially outward in radial direction. Due to the physical forces acting on the oil flow, the oil flow would be atomized or swirled after the passages (expansion due to higher diameter-dependent velocity). In order to prevent this, the passages are formed to narrow in diameter in radial direction. This prevents an expansion of the oil flow. Therefore, the oil flow enters the outlet channel with extensively laminar flow.

Cooling oil guiding devices according to embodiment forms are characterized in that the cross section of the outlet channels decreases outward in radial direction. In addition to the air flowing in via the inlets for equalizing the occurring negative pressure, the outlet channels can be additionally provided with a cross section which narrows in diameter outward. As with the above-described passages, an expansion of the oil flow can be counteracted by the preferably continuously reduced cross section. This leads to an oil flow which exits from the outlet channel with a flow that is as laminar as possible. Accordingly, a swirling or atomization of the oil flow is reduced or prevented so that a defined feed is facilitated or is made possible.

Embodiment forms of a cooling oil guiding device are characterized in that the outlet channels have a tear-off edge at their radially outer rim on at least one side, this tear-off edge having an angle of less than or equal to 90°. In order to minimize the expansion of the oil flow as far as possible as it exits from the outlet channel, a tear-off edge is provided on at least one side of the outer rim of the outlet channel. The tear-off edge is preferably provided at a plurality of, particularly all, sides of the radially outer rim of the outlet channel. As a result of the tear-off edge, the oil flow detaches directly from the wall of the outlet channel and an oil flow, which is as laminar as possible, is maintained with little or no expansion. In order for the flow to detach, the tear-off edge has an acute angle of less than or equal to 90°.

Cooling oil guiding devices are characterized in embodiment forms in that the inlets have a radius at their radially outer rim on at least one side. For the in-flowing air, on the other hand, it is advantageous that the edges of the radially outer rim of the inlets are rounded. Due to the rounded inlets, a more uniform flow of air is achieved, and turbulence in the air flow is reduced.

Embodiment forms of a cooling oil guiding device are characterized in that the outlet elements are rounded at the side thereof facing the annular channel so that an air flow from the inlets via the annular channel to the outlet channels is kept as laminar as possible. Additional swirling of the oil flow due to a turbulent air flow can be prevented or reduced by keeping the air flow as laminar as possible and preventing turbulence.

Embodiment forms of a cooling oil guiding device are characterized in that the blocking elements have guiding elements at the passages, which guiding elements protrude radially into the annular channel in order to guide an air flow in the annular channel in direction of the outlet channels. The air flowing in via the inlets should exit again together with the oil flow via the outlet channels. In order to guide the air flow in a corresponding manner and minimize turbulence, guiding elements are provided which project into the annular channel. The guiding elements change the direction of the open cross section of the annular channel in direction of the outlet channel, preferably continuously.

A further aspect of the present application is a powertrain of a vehicle characterized in that a cooling oil guiding device is provided in accordance with the description. Cooling oil can be selectively distributed by a cooling oil guiding device of this kind.

Embodiment forms of a powertrain are characterized in that the cooling oil guiding device is provided in a hybrid module. A reliable supply of cooling oil is important particularly in a hybrid module in which, for example, an electric machine enclosing rotating component parts must be cooled. This can be ensured by a cooling oil guiding device according to one aspect of the invention.

Powertrains according to embodiment forms are characterized in that the cooling oil guiding device is provided in a clutch arrangement. Wet clutches in particular require a reliable supply of cooling oil especially in actuated state. This can be ensured by a cooling oil guiding device according to the invention.

Embodiment forms of a cooling oil guiding device for a clutch arrangement in which a clutch is provided that can be actuated via a piston movable in axial direction in order to change between an actuated position and an open position, in which the piston is arranged radially inwardly of the clutch, in which the piston separates a pressure space and a compensation space from one another, in which the compensation space is delimited by a compensation space cover which is stationary in axial direction and a seal cover that is coupled to the piston, and in which the compensation space cover and the seal cover overlap radially outwardly in axial direction and are connected to be movable relative to one another in axial direction via a sealing element, are characterized in that an overflow opening which connects the compensation space to an oil channel provided between the seal cover and the piston is provided in the seal cover, in that the oil channel opens outward in radial direction, and in that a control edge is provided at a component part which is axially immovable relative to the piston, by which control edge at least most of an oil flow exiting from the oil channel is guided through the clutch when the clutch is closed and is guided past the clutch when the clutch is open.

Within the meaning of the present disclosure, a clutch is a mechanism for mechanically transmitting or disconnecting torque from an input side to an output side. In particular, a clutch has one or more friction components that are brought in and out of contact with one another or with a pressure plate. For example, a clutch can be a single plate clutch, a multiple plate clutch or a cone clutch. The clutch is actuated by an axially movable piston. In order to move the piston, this piston has a pressure space on one side which can be pressurized with a fluid, preferably oil. A compensation space is provided on the other side of the piston. In order to ensure problem-free functioning, the compensation space is filled with oil, preferably without being pressurized.

The compensation space is partially delimited by a compensation space cover which is provided to be fixed in axial direction with respect to the clutch. The compensation space is further delimited by a seal cover which is connected to the piston and is movable jointly with the latter. The compensation space cover and the seal cover overlap in axial direction so that the compensation space remains closed also during a relative movement between the compensation space cover and the seal cover. A sealing element is provided between the compensation space cover and seal cover in order to prevent or minimize oil exiting from the compensation space.

The seal cover and the piston are connected to one another such that an oil channel that opens outward in radial direction is formed between the seal cover and the piston. At least one overflow opening that connects the compensation space to the oil channel is provided at the seal cover. The overflow opening ensures that no oil pressure or no excessive oil pressure, in particular relative to the pressure space, builds up in the compensation space, and the oil flowing out through the overflow opening can be used simultaneously as cooling oil for further components, for example, the clutch. The overflow opening can be formed, for example, as an annular gap that extends over the entire circumference or a plurality of orifices distributed over the circumference.

When the clutch is closed, this clutch is preferably provided with cooling oil to ensure that heat is carried off to a sufficient extent and so as to prevent overheating and increased wear. Conversely, when the clutch is open, it is advantageous when no cooling oil or only small amounts of cooling oil are supplied to the clutch in order to reduce a drag torque resulting from cooling oil present between the friction elements of the clutch. For this purpose, a control edge is provided at an axially immovable part, this control edge being arranged in axial direction between the axial end positions of the radially outer opening of the oil channel when the clutch is open or closed. Accordingly, by the control edge, the oil flow exiting from the oil channel dependent upon centrifugal force can be selectively supplied to the clutch or guided past the clutch to supply other components such as an electric machine or the like. Depending on the embodiment form, the oil flow can also be divided by the control edge so that the oil flow is guided past the clutch only partially rather than in its entirety. The control edge is preferably formed as a circumferential inwardly protruding projection.

Embodiment forms of a cooling oil guiding device are characterized in that the control edge is provided at the compensation space cover. The control edge is advantageously provided at the compensation space cover because of the axially fixed arrangement with respect to the clutch and the spatial proximity of the compensation space cover to the seal cover and, therefore, to the oil channel. As a result of the spatial proximity, it can be ensured that the oil flow can be switched substantially in its entirety by the control edge, since there is only minimal expansion or misting, if any, of the oil flow.

Other embodiment forms of a cooling oil guiding device are characterized in that the control edge is provided at an inner carrier of the clutch. This advantageously facilitates the production of the compensation space cover and possibly saves weight.

Cooling oil guiding devices according to embodiment forms are characterized in that the overflow opening is provided in the radially inner area of the seal cover. By providing the overflow opening in the radially inner area, it is ensured that the compensation space is sufficiently filled with oil, since the compensation space fills with centrally supplied oil radially outwardly depending on centrifugal force.

Embodiment forms of a cooling oil guiding device are characterized in that the control edge is formed as a radially inwardly protruding projection which, at least on one side in axial direction, delimits an annular space with radial through-openings distributed along the circumference. Because of the radially inwardly protruding projection, the oil flow coming from radially inward is reliably supplied to different areas corresponding to the switching position of the piston. An annular space is advantageously provided adjacent to the projection. The supplied cooling oil can be selectively guided to the clutch or further component parts via the through-openings in the annular space.

Cooling oil guiding devices according to embodiment forms are characterized in that the control edge is provided in an axial end area, or two annular spaces adjacent to one another in axial direction are separated from one another by the control edge.

It is advantageous for a simpler component geometry when the projection is provided in an axial end area. In this way, the oil flow can be guided directly radially past the component part in one of the switching positions of the piston.

The cooling oil can also be distributed over a greater axial area through an annular space or annular spaces, or through-openings thereof, provided on both sides of the projection particularly when the axial spacing of the different positions for supplying the cooling oil, which depend on the switching position of the piston is greater than the axial stroke of the piston.

Embodiment forms of a cooling oil guiding device are characterized in that at least one spacer is provided between the seal cover and the piston, and in that the spacer has at least one continuous cutout extending in radial direction to form the oil channel. At least one spacer is preferably provided in order to facilitate the positioning of the piston and seal cover relative to one another and to reliably keep the oil channel open in the event of a possible deformation of the component parts, for example, due to pressure. The extension of the oil channel in axial direction is determined by the spacer. Further, the connection between the piston and the seal cover can be carried out via the spacer or spacers. In order to the form the oil channel, the spacer and/or spacers have cutouts therebetween which are radially continuous.

Cooling oil guiding devices according to embodiment forms are characterized in that the spacer is provided in the radially outer area. As the result of spacers in the radially outer area, the geometry of the outlet of the oil channel can be adapted by the spacer if necessary, for example, in order to achieve the least possible expansion of the exiting oil flow so as to facilitate the separation by the control edge.

A further aspect of the present application is a powertrain which is characterized in that a clutch arrangement is provided with a cooling oil guiding device according to one of the embodiment forms described herein.

Another aspect of the present application is a hybrid module for a powertrain, which is characterized in that a clutch arrangement is provided with a cooling oil guiding device according to the description, and in that a control edge is provided at a component part which is axially immovable relative to the piston, by which control edge an oil flow exiting from the oil channel is guided at least for the most part through the clutch when the clutch is closed and past the clutch when the clutch is open as well as to a rotor of an electric machine of the hybrid module.

BRIEF DESCRIPTION OF THE DRAWINGS

The invention will be explained in more detail with reference to the figures Like or similar component parts are designated with consistent reference numerals. In particular, the figures show.

DETAILED DESCRIPTION OF THE PRESENTLY PREFERRED EMBODIMENTS

FIGS. 1a, 1b, 2a and 2b show a section of a hybrid module for a powertrain with embodiment examples of a cooling oil guiding device of which primarily the component parts of a clutch arrangement are shown. In view of the extensively rotationally symmetrical construction, one half is shown.

The clutch arrangement comprises a clutch 1 that can be constructed in particular as a friction clutch. In the present example, the input side of the clutch 1 is connected to an inner carrier 8. The inner carrier 8 is connected to an input shaft. The output side of the clutch 1 is connected to a rotor carrier 17 in the depicted embodiment example. A rotor 11 of an electric machine is provided on the rotor carrier 17, and the rotor carrier 17 is connected in the depicted embodiment example to a housing of a torque converter; other constructions in which, for example, the rotor carrier is directly connected to an output shaft or intermediate shaft are also possible.

An axially movable piston 2 is provided for actuating the clutch 1. For pressure to act upon the piston 2, a pressure space D is provided which is delimited in the depicted embodiment example by the piston 2, the housing of the torque converter, a seal arranged therebetween and an intermediate shaft connected to the housing and which can be acted upon by oil pressure through the intermediate shaft. A compensation space G is located axially opposite the pressure space D with respect to the piston 2. The compensation space G is likewise supplied with oil to lubricate the component parts and equalize an oil pressure in the pressure space D in the unpressurized state. In the depicted embodiment example, an elastic restoring element such as one or more springs is also provided for the piston 2 in the compensation space G, by which the piston 2 is restored to its initial position, in this case an open position, in the unpressurized state.

In the depicted embodiment example, the compensation space G is delimited by the intermediate shaft, via which the supply of oil is also carried out, a compensation space cover 3 connected to the intermediate shaft, and the piston 2 and a seal cover 4, respectively, which is connected to the piston 2. A sealing element 5 which abuts the compensation space cover 3 is provided at the seal cover 4.

Together with the piston 2, the seal cover 4 encloses an oil channel K extending substantially in radial direction. An overflow opening 6 connecting the compensation space G to the oil channel K is provided at the radially inner end of the seal cover 4. The overflow channel 6 can be constructed as a circumferential annular gap or formed by one or more cutouts distributed along the circumference. The oil channel K is open at its radially outer end in order to deliver exiting oil as cooling oil to the radially surrounding component parts.

An oil flow dependent upon the cooling oil guiding device is represented by arrows in the figures.

The basic construction described is the same for all of the depicted examples, particularly FIGS. 1a, 1b, 2a and 2b, although other forms are possible.

Figure 1A:
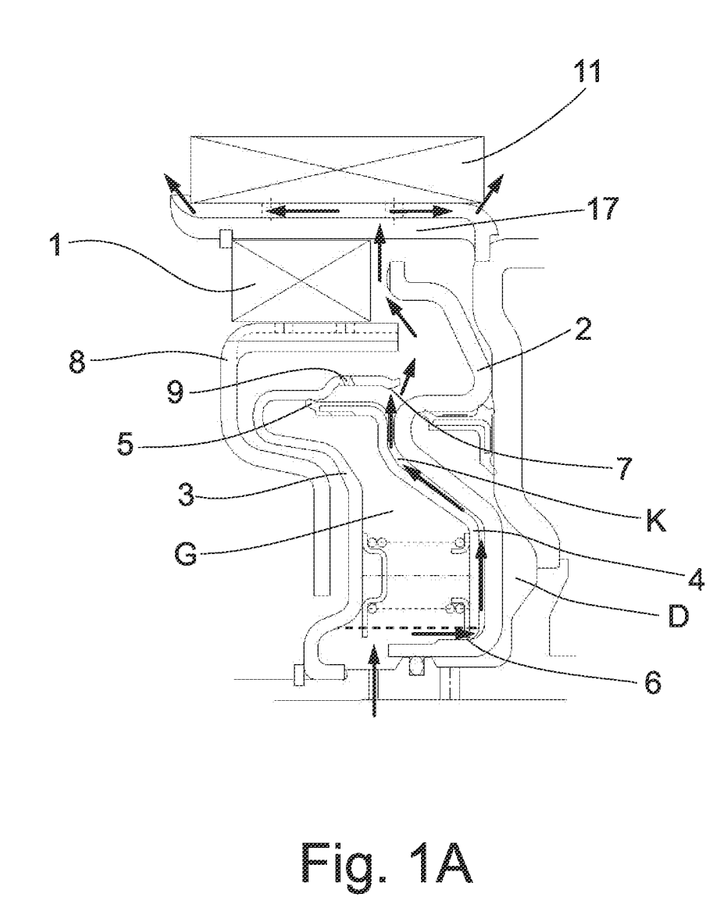
FIG. 1A is a cooling oil guiding device with open clutch.

FIG. 1a shows the example in an unactuated state of the clutch 1 in which the piston 2 is not acted upon by pressure.

The compensation space cover 3 in the depicted example has at the radially outer end a portion that extends in axial direction toward the piston 2. A radially inwardly protruding control edge 7 is provided in the axial end area of the compensation space cover 3, this control edge 7 being arranged in the area of the oil channel K, preferably in the adjacent area in axial direction around the seal cover 4. Accordingly, at least the majority of the oil flow is guided past the compensation space cover 3 and, therefore, past the clutch 1 that radially surrounds the compensation space cover 3. In the unactuated state, the clutch 1 does not require a supply of cooling oil. Because no cooling oil or only small amounts of cooling oil are supplied, a drag torque occurring between the input side and the output side of the clutch 1 is prevented or at least reduced so that losses can be reduced.

In the depicted example of a hybrid module, the oil flow is guided past the clutch 1 to the rotor 11 of an electric machine that surrounds the clutch arrangement in order to ensure cooling thereof. A cooling of the electric machine is required regardless of whether or not a drive such as an internal combustion engine connected to the input side of the clutch 1 is connected to the further drivetrain via the clutch 1. In the depicted embodiment example, the cooling oil impinges on a rotor carrier 17 for the rotor 11 of the electric machine and is conveyed by the rotor carrier 17 so as to be distributed over the axial extension of the rotor 11.

Figure 1B:
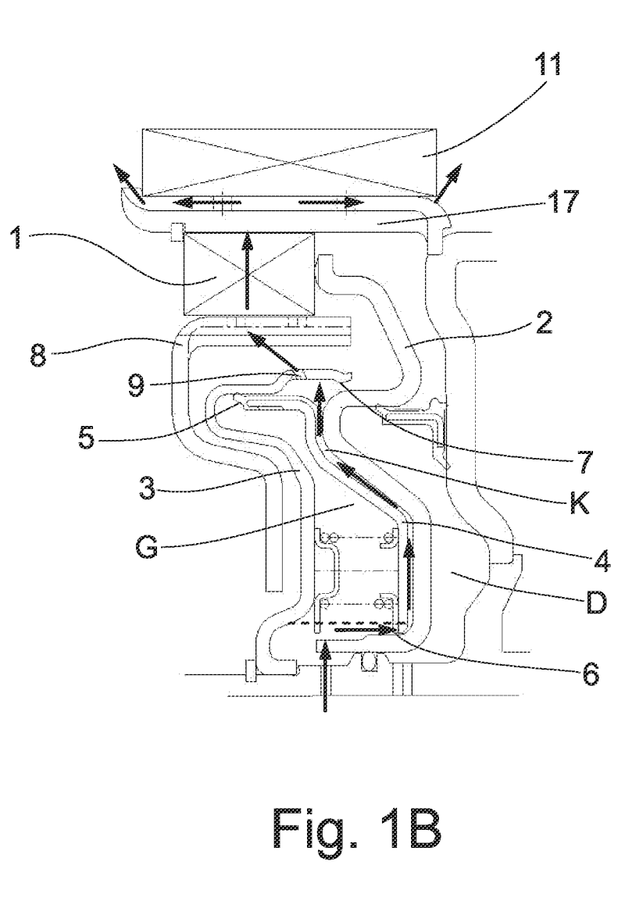
FIG. 1B is the cooling oil guiding device according to FIG. 1a with closed clutch.

FIG. 1b corresponds to the example according to FIG. 1a in which the clutch 1 is shown in an actuated state. The piston 2 is displaced into its actuated position by the pressure space D that is acted upon by pressure. Along with this, the oil channel K is also displaced in axial direction relative to the compensation cover 3 and the control edge 7 provided at the latter.

Therefore, the oil flow impinges on the compensation space cover 3 and is guided by the control edge 7 in direction of an annular space which is provided at the compensation space cover 3 adjacent to the control edge 7. Through-openings 9 via which the cooling oil can be guided to radially surrounding component parts are provided at the compensation space cover 3 in the area of the annular space.

In the depicted embodiment example, the cooling oil is guided through the through-openings 9 to the inner carrier 8 of the clutch 1 and directed from the inner carrier 8 through the clutch 1. After the clutch 1, the cooling oil is routed from the rotor carrier 17 to the electric machine, in particular to the rotor 11.

Accordingly, by the control edge 7, the oil flow is selectively conducted in the desired axial direction and prevented from flowing off into other areas. Depending on the position of the control edge 7, forms are also possible in which, particularly when there is a significantly widening gush of the oil flow, the oil flow is divided by the control edge 7 in order to supply all of the component parts with cooling oil in a constant manner but so as to change the distributed amount depending on the switching position of the piston 2.

Figure 2A:
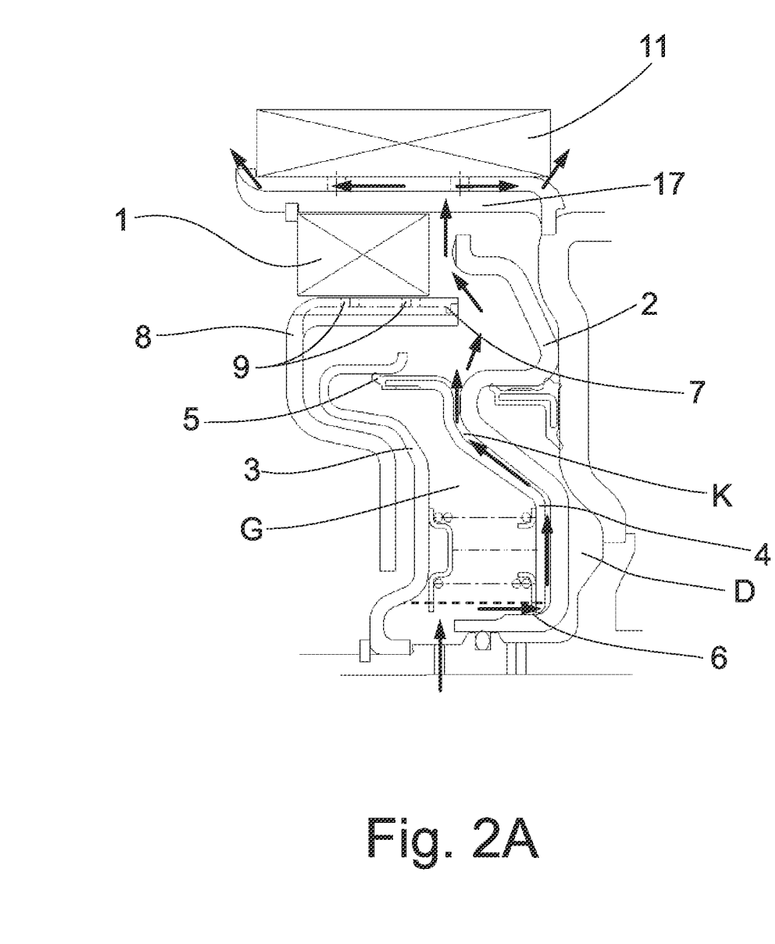
FIG. 2A is a cooling oil guiding device with open clutch.
Figure 2B:
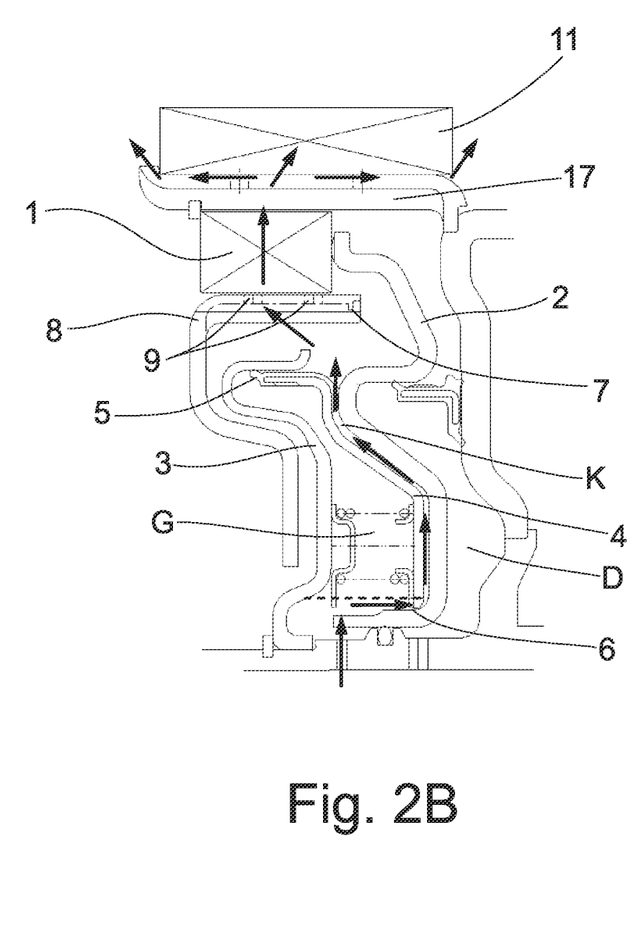
FIG. 2B is the cooling oil guiding device according to FIG. 2a with closed clutch.

FIGS. 2a and 2b show a further example of the cooling oil guiding device. The basic construction is identical to that in the embodiment example in FIGS. 1a and 1b. Also, FIG. 2a and FIG. 2b show an unactuated state and an actuated state, respectively, of the piston 2 and clutch 1. The difference consists in that the compensation space cover 3 does not have any area lengthened axially in direction of the piston 2; rather, the control edge 7 is provided at the inner carrier 8 of the clutch 1.

The control edge 7 in FIGS. 2a and 2b is likewise similarly arranged in an axial area which is adjacent to the outlet of the oil channel K in the movement direction of the piston 2. In this way, the oil flow can be correspondingly guided past the clutch 1 or through the clutch 1 similar to the description above referring to FIGS. 1a and 1b.

Figure 3:
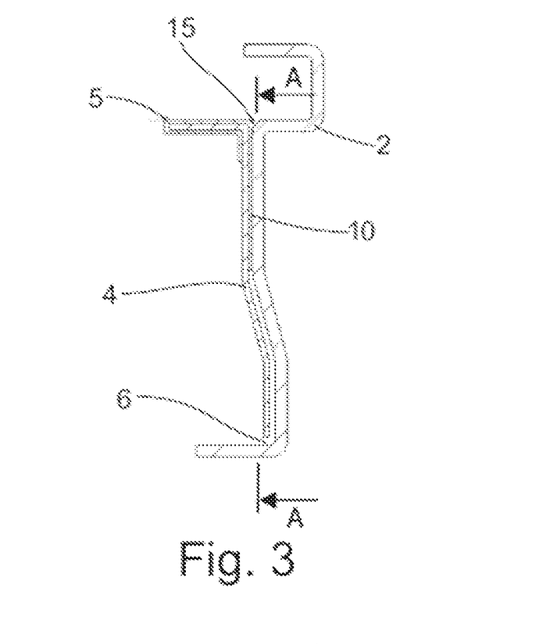
FIG. 3 a piston with seal cover.

FIG. 3 shows a piston 2 with seal cover 4. Similar to FIGS. 1a, 1b, 2a and 2b, a sealing element 5 is provided at the seal cover 4 so as to seal off a compensation space G. An overflow opening 6 is provided radially inwardly, and cooling oil can flow through this overflow opening 6 into the oil channel 6 formed between the seal cover 4 and piston 2. In order to ensure that the oil channel K is kept open during operation, spacers 10 are provided in the depicted example, since deformation can come about as a result of forces occurring during operation.

As is shown, the spacers 10 can be arranged in the radially outer area. However, forms in which the spacers 10 are provided at different positions are also possible. In other possible forms, the spacers 10 extend substantially over the radial extension of the seal cover 4, or a plurality of spacers 10 are provided on various diameters.

As is shown in FIG. 3, the spacers 10 can be arranged integral with or in conjunction with the sealing element 5. Alternatively or additionally, the spacers 10 can also be formed by a separate component part or by shaped portions at the seal cover 4 and/or piston 2 and combinations thereof. The spacers 10 must make the oil channel K possible. For this reason, the spacers 10 may not be formed in circumferential direction as a ring closed via the thickness of the oil channel K in order to provide a radially continuous oil channel K.

In the depicted embodiment example, a tear-off edge 15 is provided at the outer end of the oil channel K. The tear-off edge 15 is provided so that the oil flow exiting from the oil channel K flows out so as to be as laminar as possible and so that an expansion or swirling and misting of the cooling oil is prevented or at least reduced. The oil flow can also possibly be offset or deflected somewhat in axial direction by the tear-off edge 15.

The clear width of the oil channel K in axial direction depends among other things on the amount of cooling oil to be delivered. The clear width is preferably in the range of 0.5 mm to 2 mm. Embodiment forms with a greater clear width, for example, 3 mm or 4 mm, are also possible.

Figure 4:
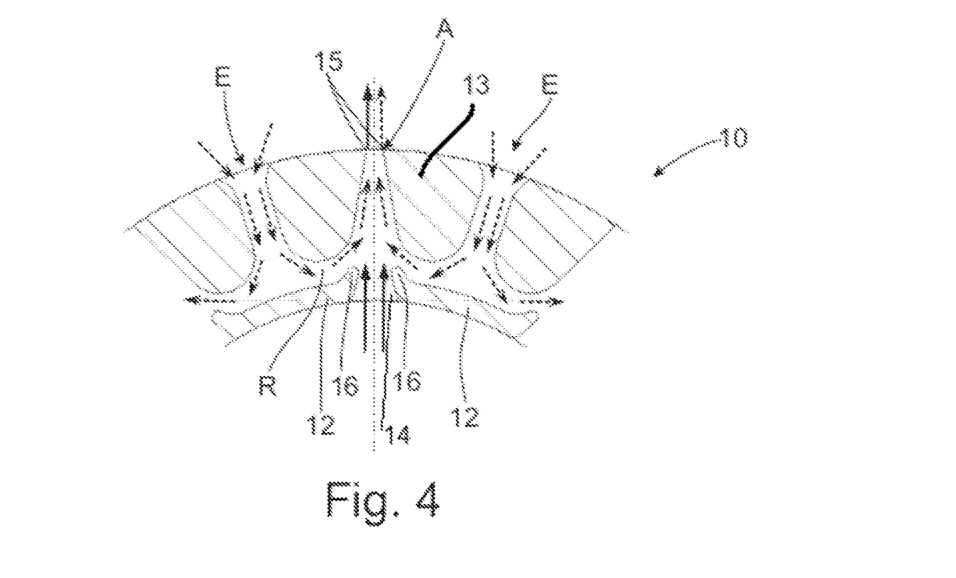
FIG. 4 a section along A-A of FIG. 3.

FIG. 4 shows a partial area of a section according to line A-A in FIG. 3 which shows the spacers 10 and the outer area of the oil channel K.

Viewed from radially inside, the spacers 10 have blocking elements 12 and outlet elements 13. The blocking elements 12 are provided circumferentially and block an inner area of the oil channel K toward the outside. At least one passage 14 or, as in the depicted example, a plurality of passages 14 that are preferably uniformly distributed over the circumference are provided between the blocking elements 12. The amount of exiting cooling oil can be limited by the passages 14.

In the example, a plurality of outlet elements 13 are provided in the radially outer rim of the oil channel K so as to be distributed over the circumference. The outlet elements 13 are adjacent to one another to form outlet channels A and inlets E. The outlet channels A are preferably arranged to be aligned with the passages 14. The inlets E are arranged in circumferential direction between the outlet channels A. The quantity of inlets E is at least one half of a quantity of outlet channels A or a multiple thereof. The quantity is preferably equal as in the depicted example. The inlets E are opposed radially inwardly by a blocking element 12. An annular channel R which connects at least one inlet E with an outlet channel A is provided between blocking elements 12 and the outlet elements 13. In the depicted example, the annular channel R extends circumferentially.

In the depicted embodiment example, guiding elements 16 which reduce the cross section of the passages 14 outwardly in radial direction are provided at the blocking elements 12 to prevent an expansion of the cooling element. The guiding elements 16 prevent an atomization of the cooling oil as it passes from passage 14 into outlet channel A, and an extensively laminar flow of the oil flow is maintained.

The oil flow is conveyed radially outward by the rotation of the component parts. Due to the increasing diameter, the conveyed volume of the oil flow generates a negative pressure which, in a free annular gap, leads to undefined intake of surrounding atmosphere such as air and mixing of this air with the oil so that swirling and misting of the exiting oil is increased. In order to prevent this, inlets E are provided through which air can flow inward. The air is selectively supplied to the outlet channel A via the annular channel R connected to the inlet E. As a result, the cooling oil flowing into the passage 14 is mixed with the sucked in air without resulting in substantial swirling.

The oil flow is shown in FIG. 4 by arrows similar to FIGS. 1a, 1b, 2a and 2b. Additionally, the flow of sucked in air is represented in FIG. 4 by dashed arrows.

Proceeding radially outward, the cross section of the outlet channel A changes in such a way that a compression of the exiting oil flow is extensively prevented, since this would otherwise lead to an expansion and, therefore, a significant swirling or misting of the oil flow after exiting from the oil channel K. The cross-sectional course preferably changes continuously so that an oil flow which is extensively laminar is obtained.

Additionally, tear-off edges 15 are provided in the depicted embodiment example at the end of the outlet channel A in order to reduce or prevent swirling and retain a laminar oil flow. Swirling of the oil flow should be prevented if possible especially in direction of the clutch 1 because this would lead to an uncontrolled amount of cooling oil which possibly results in an increased drag torque.

The tear-off edge 15 can extend in circumferential direction as in FIG. 3 and/or in axial direction as in FIG. 4. As is shown, the tear-off edge 15 can be produced preferably in one part, although other variants are also possible. The edges at the inlets E are preferably rounded to allow the air to flow in as uniformly as possible.

The invention is not limited to the described embodiments. As stated above, only individual advantageous features may be provided or various features of different examples may be combined with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A cooling oil guiding device for rotating component parts, comprising:
   an oil channel that extends in radial direction, wherein cooling oil can be supplied from radially inward and the oil channel is partially open radially outwardly;
   outlet elements arranged in the oil channel;
   blocking elements that are arranged entirely radially inwardly of the outlet elements in a radially outer area of the oil channel and configured to redirect the cooling oil exiting the outlet elements,
   wherein the outlet elements and the blocking elements do not circumferentially overlap;
   at least two passages in radial direction which are distributed along a circumference of the blocking elements; and
   outlet channels, which are aligned with the at least two passages and inlets which are disposed between the outlet channels in circumferential direction are formed by the outlet elements, and an annular channel is provided between the blocking elements and the outlet elements to connect the inlets with the outlet channels and at least two passages, respectively,
   wherein a cross section of each of the at least two passages decreases radially outward in radial direction.

2. The cooling oil guiding device according to claim 1, wherein the outlet channels have a tear-off edge at their radially outer rim on at least one side, the tear-off edge having an angle of less than or equal to 90°.

3. The cooling oil guiding device according to claim 1, wherein the inlets have a radius at their radially outer rim on at least one side.

4. The cooling oil guiding device according to claim 1, wherein the outlet elements are rounded at a side thereof facing the annular channel so that an air flow from the inlets via the annular channel to the outlet channels is kept as laminar as possible.

5. The cooling oil guiding device according to claim 1, wherein the blocking elements have guiding elements at the at least two passages, the guiding elements protrude radially into the annular channel in order to guide an air flow in the annular channel in direction of the outlet channels.

6. A cooling oil guiding device for rotating component parts, comprising:
- an oil channel that extends in radial direction, wherein cooling oil can be supplied from radially inward and the oil channel is partially open radially outwardly;
- outlet elements arranged in the oil channel;
- blocking elements that are arranged entirely radially inwardly of the outlet elements in a radially outer area of the oil channel and configured to redirect the cooling oil exiting the outlet elements,
- at least two passages in radial direction which are distributed along a circumference of the blocking elements; and
- outlet channels, which are aligned with the at least two passages and inlets which are disposed between the outlet channels in circumferential direction are formed by the outlet elements, and an annular channel is provided between the blocking elements and the outlet elements to connect the inlets with the outlet channels and at least two passages, respectively,
- wherein a cross section of the outlet channels decreases outward in the radial direction.

7. A powertrain of a vehicle, comprising:
a cooling oil guiding device, comprising:
- an oil channel that extends in radial direction, wherein cooling oil can be supplied from radially inward and the oil channel is partially open radially outwardly;
- outlet elements arranged in the oil channel;
- blocking elements that are arranged entirely radially inwardly of the outlet elements in a radially outer area of the oil channel and configured to redirect the cooling oil exiting the outlet elements,
- wherein the outlet elements and the blocking elements do not circumferentially overlap;
- at least two passages in radial direction which are distributed along a circumference of the blocking elements; and
- outlet channels, which are aligned with the at least two passages and inlets which are disposed between the outlet channels in circumferential direction are formed by the outlet elements, and an annular channel is provided between the blocking elements and the outlet elements to connect the inlets with the outlet channels and at least two passages, respectively,
- wherein a cross section of each of the at least two passages decreases radially outward in radial direction.

8. The powertrain according to claim 7, wherein the cooling oil guiding device is provided in a hybrid module.

9. The powertrain according to claim 8, wherein the cooling oil guiding device is provided in a clutch arrangement.

10. The powertrain according to claim 7, wherein the cooling oil guiding device is provided in a clutch arrangement.

* * * * *